United States Patent [19]
Miura et al.

[11] Patent Number: 5,382,147
[45] Date of Patent: Jan. 17, 1995

[54] INTERMITTENTLY HEATED INJECTION MOLDING APPARATUS

[76] Inventors: Isago Miura, 1-4-19 Honcho, Asaka-shi, Saitama-ken 351; Takashi Miura, 1-14-1 Hiyoshi, Kohoku-ku, Yokohama-shi, Kanagawa-ken 233, both of Japan

[21] Appl. No.: 41,013

[22] Filed: Mar. 31, 1993

[30] Foreign Application Priority Data

May 11, 1992 [JP] Japan .................. 4-117332

[51] Int. Cl.⁶ .............................. B29C 45/20
[52] U.S. Cl. .................. 425/144; 264/328.15; 425/549
[58] Field of Search ............... 425/547, 548, 549, 144; 264/328.15

[56] References Cited

U.S. PATENT DOCUMENTS

| | | | |
|---|---|---|---|
| 3,196,198 | 7/1965 | Rex | 425/548 |
| 4,370,115 | 1/1983 | Miura | 425/144 |
| 4,433,969 | 2/1984 | Gellert | 425/549 |
| 4,955,804 | 9/1990 | Martell et al. | 425/549 |
| 5,055,025 | 10/1991 | Muller | 425/547 |

*Primary Examiner*—Tim Heitbrink
*Attorney, Agent, or Firm*—Fulbright & Jaworski

[57] ABSTRACT

In an intermittent heating apparatus for plasticized fluids in injection or similar moldings, heating medium passages are located outside the electric resistance heating tubes for a liquid or gas to pass therethrough while being in contact with the outer surfaces thereof, also provided is a heating/cooling device having both a high temperature heating medium heated to a high temperature close to the temperature at which said reaction of the raw material is rapidly promoted and a low temperature heating medium of a temperature range where the promotion of said reaction of the raw material can be neglected.

6 Claims, 3 Drawing Sheets

INTERMITTENTLY HEATED INJECTION MOLDING APPARATUS

FIELD OF THE INVENTION

The present invention relates to an intermittent heating apparatus for heating each injection shot quantity of a plasticized raw material fluid to be injected into molding cavities during the flowing immediately before injecting the said fluid in various types of molding such as injection, transfer, low-pressure or similar moldings.

BACKGROUND OF THE INVENTION AND RELATED ART STATEMENT

As a known heating apparatus of this type, there is a U.S. Pat. No. 4,370,115 (equivalent to British Patent No. 2,079,662, French Patent No. 80 15930 and German Patent No. 30 27 698) proposed by the inventor, et al.

Said conventional apparatus, however, has the following shortcomings: firstly, it is designed to cut off the heating power a little before discharge termination of the raw material and to keep this raw material flowing until the time of discharge termination. The object of this is, on the one hand, to cool and diffuse high temperature storage heat remaining in the heating tubes and connected raw material passages which are used as heating elements by means of the incessantly flowing raw material and, on the other hand, to enable the raw material itself to be kept, when its flowing stops, in a safe temperature range where the promotion of reactions can be neglected. If cooling and diffusion of storage heat are insufficient, reactions such as crosslinking and vulcanization may be irreversibly promoted in the raw material after stopping its flow, likely to make the following molding impossible. In the conventional apparatus, however, it is not only the cooling and diffusion efficiency of storage heat caused by the passing raw material after cutting off heating power which are insufficient. There is also the generation of frictional heat resulting from the raw material passing through the heating tubes which continues until the raw material stops flowing, thus rendering cooling and diffusion of said storage heat wholly insufficient. Therefore, it is in fact desirable to cut off heating power a little before, a few seconds for example, the moment of discharge termination. Actually, however, unless the heating power is cut off considerably earlier than said desirable time, thereby allowing a corresponding prolongation of the cooling time caused by the passing raw material, the said cooling effect cannot be obtained. This means that the power flow period required for heating the raw material at each discharge time, i.e., heating capacity, decreases correspondingly, causing a large quantity of raw material which has not yet reached the desired high temperature to be injected into cavities, having an ill effect on the reaction of molded products and preventing a desirable shortening of the molding cycle.

The second problem relates to the application of heating power a little before the moment of discharge initiation. The reason for applying heating power prior to the initiation of the raw material flow is to preheat the raw material stationary in the tubes and to enable the total quantity of the raw material to be injected into cavities to approach the high temperature that rapidly promotes said reaction throughout the injection of the raw material. In said heating device, however, heating of the stationary raw material due to Joule's heat generated in the heating tubes may entail the potential danger of causing the temperature at the contact surface of the raw material in the contact area between the heating tubes and raw material, to unlimitedly increase with heating time. This limits heating by applying power a little prior to discharge to a short period of only a few seconds, thus making it impossible to heat the stationary raw material all the way to its interior up to the desired temperature.

As stated above, during the molding process, the conventional apparatus takes care of the problem of heating response and has here-proved to be efficient; in reality, however, it has posed a problem of inferior cooling response.

OBJECT AND SUMMARY OF THE INVENTION

Accordingly, it is the object of the present invention to provide an intermittent heating apparatus for plasticized fluids employed in injection and similar moldings capable of solving said conventional problems, superior in heating and cooling response, and capable of shortening the molding cycle.

The intermittent heating apparatus for plasticized fluids in injection or similar moldings embodied in the present invention, provides, in order to attain said object in a heating device as described before, heating medium passages at the exterior of the heating tubes allowing a fluid or a gas to pass through while being in contact with the external surfaces of the heating tubes. It also provides a heating/cooling apparatus using a high temperature heating medium heated to a high temperature close to the temperature that could abruptly promote a reaction of the raw material and a low temperature heating medium of a temperature range where the promotion of a reaction thereof can be neglected. While heating power is applied a high temperature heating medium is passed through the heating medium passages and while, on the one hand, the raw material passing through the heating tubes heats up with Joule's heat and frictional heat, the moment heating power is cut off, a low temperature heating medium is passed through the said heating medium passages and rapidly cools the raw material passing through or stationary in the heating tubes to a temperature range where the reaction can be neglected. Thus, the moment heating power is cut off, a high temperature heating medium is converted into a low temperature one and passed through, thereby keeping detrimental storage heat remaining in the heating tubes in a temperature range where its reaction, together with the cooling action caused by the flowing raw material, can be neglected. The preheating of the stationary raw material just before the initiation of the following discharge is mainly realized by heating with a high temperature heating medium. Thus, cooling response can be improved and a diffusion effect of detrimental storage heat achieved. In the intermittent heating apparatus for plasticized fluids, as stated before, cooling as well as heating response can be improved.

Improved cooling response creates the possibility of realizing a diffusion effect of detrimental storage heat and as this, in turn, makes it possible to increase heating time for the raw material by the amount of time it takes, compared with traditional methods, to slightly prolong the time of the power flow before cutting off the heating power and this up to just before the moment of stopping the discharge (a short period only a few seconds prior to this), and also makes it possible to improve the heating effect, to shorten the molding cycle and has a great many other advantages. This allows us to produce superior molded products at high speed and reasonable price.

The heating/cooling apparatus of one embodiment of the invention is equipped with only a low temperature liquid heating medium and a low temperature liquid heating medium is passed through the heating medium passages when the heating power is cut off, the raw material passing through or stationary in the heating tubes is rapidly cooled to a temperature range where a reaction can be neglected, air is blown into the heating medium passages before the initiation of the following discharge flow of the raw material, and the low temperature liquid heating medium is thereby removed from the same passages. This not only eliminates the need of using a high temperature heating medium but also enables water or warm water to be used as a low temperature liquid heating medium.

Another embodiment of the invention is equipped with at least electric resistance heating tubes and a heating medium passage located at each passage that supplies the raw material discharged from a dicharging device divided into multiple divisions to cavities or cavity groups.

BRIEF DESCRIPTION OF THE DRAWINGS

A preferred form of the present invention is illustrated in the accompanying drawings in which.

DETAILED DESCRIPTION OF PREFERRED EMBODIMENTS

Figure 1:
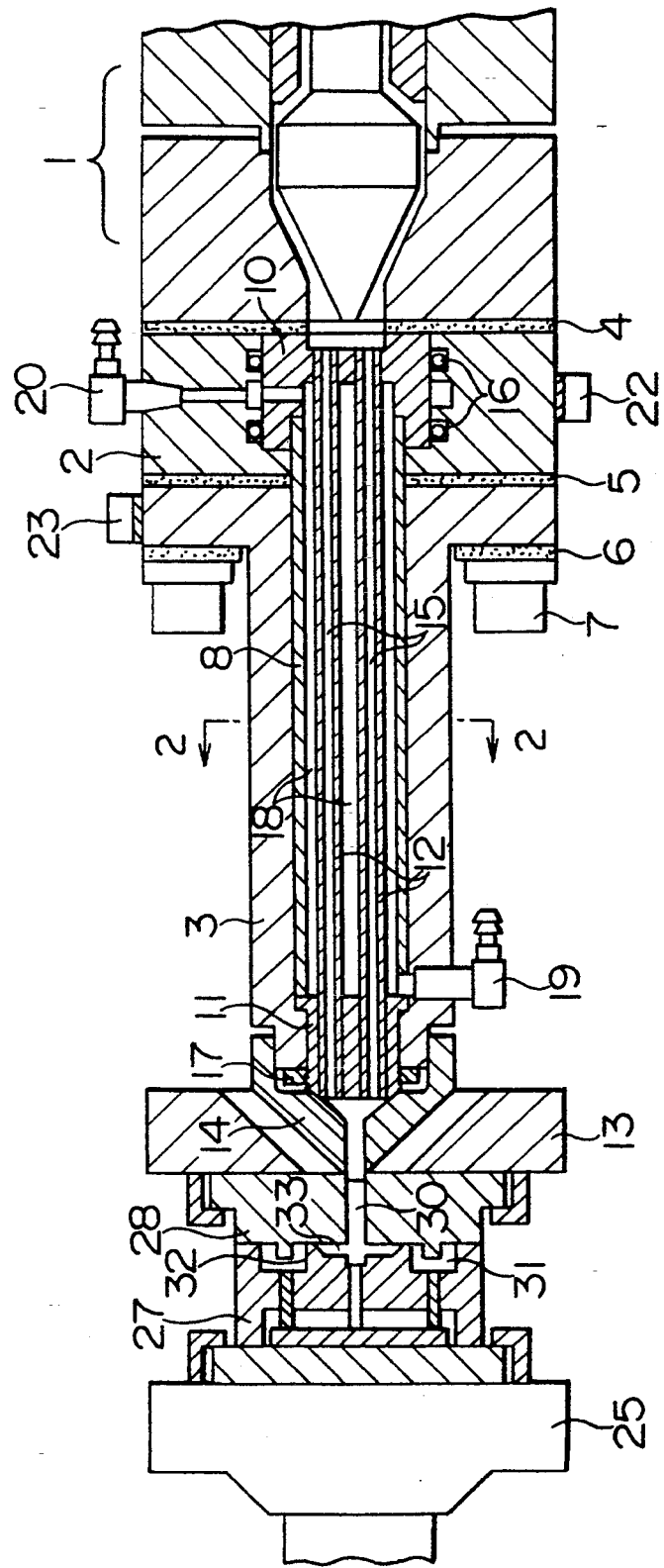
FIG. 1 is a longitudinal front view of an intermittent heating apparatus for plasticized fluids in injection or other moldings according to the invention.
Figure 2:
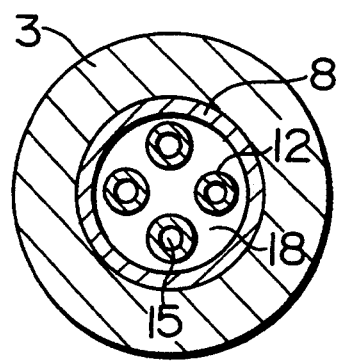
FIG. 2 is a longitudinal side view along the A—A line of FIG. 1.

Referring to FIGS. 1 and 2, reference numeral 1 denotes an injection molding machine head, in mold-direction of which a flange 2 and a nozzle holder 3 are respectively interpositioned by insulating plates 4, 5 and 6 and fastened by clamping bolt 7. Insulating tube 8 is installed through flange 2 and nozzle holder 3. One end of insulating tube 8 is fastened by a fitting into a heating tube substrate 10 located in a bore of flange 2, the other end being in communication with the rear end opening of a heating tube cap 11 fitted into and fastened to the front end opening of nozzle holder 3. In insulating tube 8, a plurality (four in this example) of electric resistance heating tubes 12 (a metal tube of stainless steel or a metallic resistance material typically about 0.03 to 0.12 in. (0.8 to 3.0 mm) in internal diameter and about 0.004 to 0.012 in. (0.1 to 0.3 mm) in wall thickness) are fitted and fastened in communication with nozzle 14, one end of each of which is in communication with the discharge opening of injection molding machine head 1 at heating tube substrate 10 and the other end aligned with the front end opening of heating tube cap 11. Both ends of this heating tube 12 are firmly bonded with heating tube substrate 10 and heating tube cap 11 by means of welding, brazing, metalplating or caulking, while the portion engaged with heating tube cap 11 may be precisely finished, providing a small clearance between the two, and used unbonded in an insertable and disengageable condition. This eliminates the need of providing another work in order to cope with minute extentions or contractions caused by heat of the length of heating tube 12. The interior of heating tube 12 serves as raw material passage 15. Numeral 16 denotes a O-ring located between flange 2 and heating tube substrate 10, and numeral 17 a nut.

In insulating tube 8, clearances between heating tubes 12 are, as described later, provided into heating medium passage 18 in which are located, in communication with each other, piping connection 19 connected to a supply pipe of a heating medium and piping connection 20 connected to a discharge tube of the same. Reference numerals 22 and 23 denote electrodes, and numeral 25 denotes a movable plate, movable mold 27 and fixed mold 28 are located between the movable plate and fixed plate 13. Reference numeral 30 denotes a sprue, numeral 31 a cavity, numeral 32 a gate and numeral 33 a runner.

In an injection molding machine unillustrated in the above, injection shot quantities of raw material rubber, heated and plasticized in a temperature range where the promotion of a reaction can be neglected, are one by one injected intermittently from a discharge opening of injection molding machine head 1. The injected raw material rubber passes through heating tube 12 and is sent in the mold direction. When, simultaneously with the passing initiation or earlier than that, a heating power of low voltage and strong current is supplied for heating tube 12 in response to said passing, the raw material rubber passing through the tube is being heated by Joule's heat generated therein. Since heating tube 12 is not only small in heat capacity of itself but also efficiently takes away Joule's heat generated by the raw material rubber when it flows away through the tube at nearly constant high velocity while coming in touch therewith, the temperature of the raw material rubber rapidly reaches a stationary state and flows in the mold direction, its temperature increasing to a nearly constant level till the said power is cut off. The raw material rubber passing through the tube is, in addition to the frictional heat generated by its passing therethrough, also heated by Joule's heat whereby the smaller the diameter of raw material passage 15 and the greater the flow velocity of the raw material rubber, the greater the frictional heat. In this way, the raw material rubber is heated both by Joule's heat and by frictional heat.

While power to heat heating tube 12 is supplied by a controller, not illustrated, it is in normal cases typically at a level below 8 V in voltage (variable) and below 1000 A In current (variable). Exceptionally, both voltage and current sometimes exceed said range, however, voltage is never so high as to entail danger to the human body. The controller receives electrical or mechanical signals from the injection molding machine and simultaneously with or a little earlier than the initiation of injecting raw material rubber (the number of seconds is variable), power of preset voltage is supplied through electrodes 22 and 23, causing Joule's heat to be generated in heating tube 12. A heating current flows through flange 2, heating tube substrate 10, heating tube 12, heating tube cap 11, nozzle holder 3 and electrode 23, causing heating tube 12 to generate the desired quantity of Joule's heat. Said heating current continues to flow until a short time (a short period of a few seconds)

before the completion of injecting an injection shot quantity of raw material rubber. Meanwhile a nearly constant voltage may be supplied or the voltage may arbitrarily be varied stepwise or continuously during the injection process in order to control the heating volume in relation to the passing raw material rubber and in accordance with time. Such a control system to detect mechanical or physical changes in the apparatus can be easily manufactured by means of, for example, a limit switch, various sensors combined with a computer, or by other methods.

Figure 3:
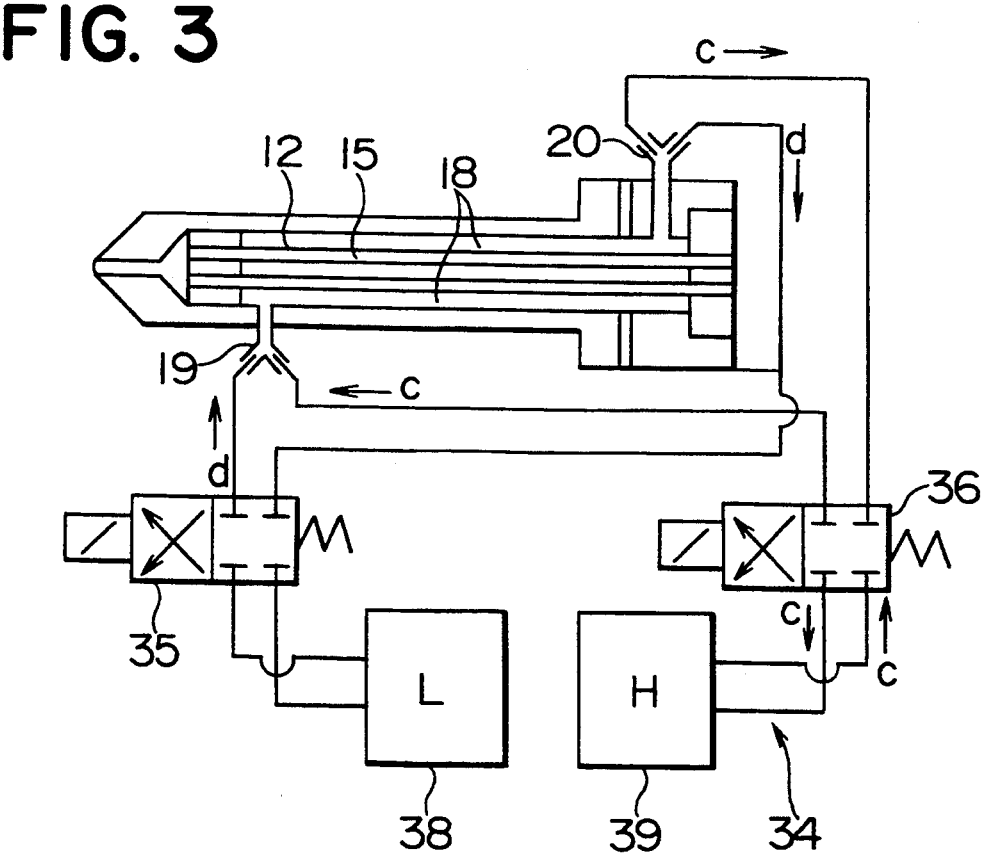
FIG. 3 is a diagram showing the piping system of a heating/cooling device involving heating media.

Raw material rubber continues to be injected in the afore-mentioned manner for a short period of time after heating power supply is cut off, which is, as stated before, to diffuse detrimental storage heat remaining in heating tubes 12 and in the outlets around the raw material passages of these tubes and to allow rubber, when stationary, to stay in a temperature range where the promotion of vulcanization can be neglected. As stated before, however, the effect of heat diffusion by the raw material rubber fails to meet expectations. To cope with this, heating/cooling device 34 employing liquid or gaseous heating medium shown in FIG. 3 has been added.

In said heating/cooling device 34, reference numerals 35 and 36 denote a directional control valve (electromagnetic selector valve), numeral 38 a low temperature oil circulation heat regulator L, numeral 39 a high temperature oil circulation heat regulator H and arrows c and d the direction in which the medium flows. In this device, a current is supplied to directional control valve 36 and almost simultaneously with the initial application of said heating power, high temperature oil, pre-regulated at high temperature by high temperature oil circulation heat regulator 39, is pressed into arrow c direction and made to pass from piping connection 19 through heating medium passage 18, while the raw material rubber passing through raw material passage 15 is also being heated by Joule's heat. Then almost simultaneously with stopping the heating power, the current to directional control valve 36 is cut off, a current is supplied to directional control valve 35, high temperature oil is circulated after having been changed into low temperature oil thus allowing the promotion of a vulcanization reaction in low temperature oil circulation heat regulator 38 to be neglected, and the raw material rubber, before and after becoming stationary in raw material passage 15, is cooled to be kept in a temperature range where the promotion of a vulcanization reaction can be neglected.

Figure 4:
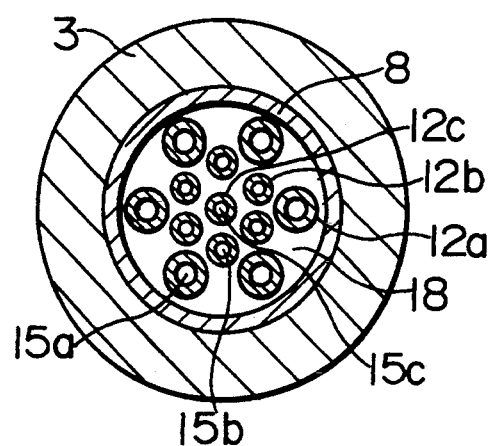
FIG. 4 is a greatly enlarged longitudinal section corresponding to FIG. 2 showing another example of the heating tubes.

FIG. 4 is an example where a difference in tube diameters of heating tube 12 is provided considering the facts that pressure distribution of the raw material rubber to be injected at multiple tube inlets of heating tube 12 is not uniform and that pressure applied on the center lines thereof is generally high. In this example, heating tubes 12a, 12b and 12c with a different bore diameter are located in such a way that, the greater their distance from the center, the wider the raw material passage. Accordingly, the greater the distance from the center of raw material passages 15a, 15b and 15c in heating tubes 12a, 12b and 12c, the wider the raw material passage, which is to create different pressure drops during the passage of the raw material rubber and so to provide a uniform flow velocity of the raw material rubber passing through each tube. When more precise control is required in terms of a uniform temperature increase in heating the raw material rubber, the quantity of rubber passing through said multiple tubes is measured, the heat quantity necessary for a uniform temperature rise of these respective quantities of rubber is calculated. From the ratio of this heat quantity, the current value ratio and moreover the electric resistance value ratio of the respective tubes is found, leaving only the outer diameter of each heating tube 12 to be determined.

Figure 5:
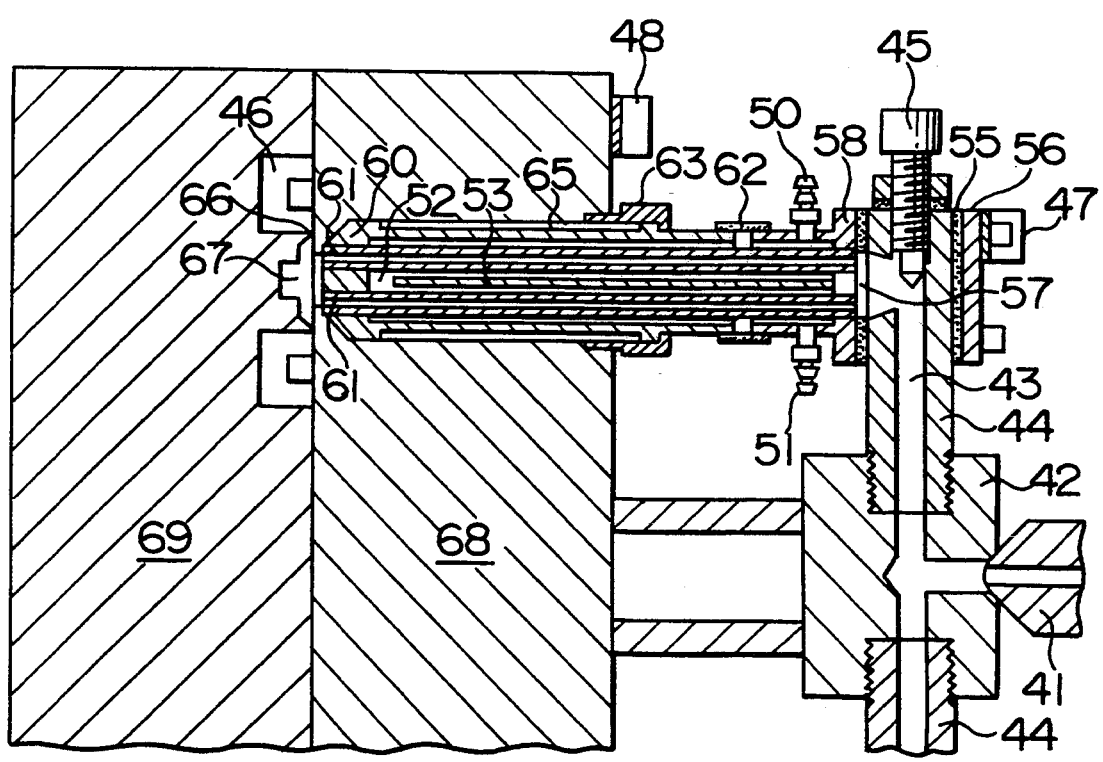
FIG. 5 is a longitudinal front view of important parts of another embodiment.

FIG. 5 shows another embodiment different from the one in FIG. 1. The former is basically different from the latter in that the respective passages that divide the raw material rubber injected from the injection molding machine and send the said material to the cavity or cavity groups, are equipped with an electrical resistance heating tube, heating device, controller, heating medium passage and heating/cooling device employing a heating medium. In cases of molding with multicavity molds, molds with a relatively long and large runner or similar molds, a way of molding called "cold runner molding method" has traditionally been used for purposes of economizing on raw material reaching vulcanization simultaneously with products, mainly at the runner section and the sprue. This embodiment is an alternative method that could replace these traditional methods. In other words, the raw material rubber is heated to a temperature range where the promotion of a reaction can be neglected, the raw material injected intermittently from the injection molding machine is received from nozzle 41 to be divided in tube fitting 42, distributed into passages 43 inside multiple raw material tubes 44, treated, when necessary, so as to keep within the said temperature range, and sent in the direction of the mold. Partly shown in FIG. 5., adjusting bolt 45, regulating the quantity of the passing raw material, is located halfway in said passage 43 in such a way as to adjust the flow rate. The raw material rubber is sent to the individual cavities 46 or to a cavity group, respectively via the heating device by Joule's heat and via the heating/cooling device by the heating medium, although the said flow rate needs to be adjusted so that the raw material rubber is sent simultaneously and homogeneously to cavities 46 or the cavity groups. A heating current is usually supplied in parallel for each heating device through electrodes 47 and 48, but it may be supplied in series. Heating and cooling by a heating medium is conducted in such a way as to admit the heating medium to heating medium passage 52 from either one of piping connections 50 or 51, the flow of which is changed by dividing plate 53 to return to said external regulator through the other piping connection. This not only allows the virtual elimination of the waste of raw material rubber at said sprue, runner or similar areas that occurs with each molding, it also enables the raw material, heated to a temperature that permits the said reaction to be rapidly promoted, to be injected into cavities or cavity groups from the nearest distance, thus leading to, among others, the shortening of the molding cycle. Reference numeral 55 denotes an insulating tube, numeral 56 a clamp strap, numeral 57 a tube inlet front surface, numeral 58 a heating tube substrate, numeral 60 a heating tube cap, numeral 61 a heating tube, numeral 62 an insulating tape, numeral 63 a cap nut, numeral 65 a clearance, numeral 66 a gate, numeral 67 a runner, numeral 68 a fixed side mold and numeral 69 a movable side mold.

Referring now to another embodiment which is not illustrated, its arrangement is such that instead of using said high temperature heating medium, the heating/cooling device contains only a low temperature liquid heating medium (mainly warm water or city water), a low temperature liquid heating medium is admitted for a sufficient number of seconds to a heating medium passage almost simultaneously with the cutting off of the said heating power flow, and the said heating tube containing the raw material is rapidly cooled off to an adequate temperature, air is blown into the heating medium passage at an arbitrary time before the raw material starts flowing for the next injection, and the low temperature liquid heating medium is completely removed from the same passage. This eliminates the need of a device using a high temperature liquid or gaseous heating medium and enables water or warm water to be used as a low temperature fluid heating medium, thus leading to the simplification of the entire apparatus.

Rubber is used as a raw material in said embodiment, although this is no more than just an example, and whatever plasticizable raw material, for example a heat-crosslinkable synthetic resin, may of course be used. The embodiment of the present invention is not limited to the above, but likely to have a wide range of applications, enabling a homogeneous, rapid foaming reaction in manufacturing foams and as an intermittent heating apparatus for heating thermoplastics requiring high molding temperatures.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An intermittent heating apparatus for plasticizing fluids comprising:
   a heating/cooling passageway;
   at least one electrically conductive heating tube for carrying a plasticizing fluid, said at least one heating tube provided within said heating/cooling passageway;
   means for heating said plasticizing fluid and intermittently pumping said plasticizing fluid into said at least one heating tube;
   means for intermittently applying a heating electrical current to said at least one heating tube;
   means for alternatingly circulating a heating medium and a cooling medium through said heating/cooling passageway;
   control means for deactivating said cooling medium circulating means and activating said heating electrical current means and said heating medium circulating means when said means for heating and pumping is activated; and
   control means for deactivating said electrical current means and said heating medium circulating means, and activating said cooling medium circulating means, when said means for heating and pumping is deactivated.

2. The apparatus of claim 1 in which one of the mediums is air.

3. The apparatus of claim 1 in which one of the mediums is liquid.

4. The apparatus of claim 1 in which the at least one heating tube is in communication with a plurality of branch passageways, each branch passageway being in communication with a molding cavity.

5. An intermittent heating apparatus for plasticizing fluids comprising:
   a heating/cooling passageway;
   at least one electrically conductive heating tube for carrying a plasticizing fluid, said at least one heating tube provided within said heating/cooling passageway;
   means for heating said plasticizing fluid and intermittently pumping said plasticizing fluid into said at least one heating tube;
   means for intermittently applying a heating electrical current to said at least one heating tube;
   means for injecting a cooling liquid into said heating/cooling passageway;
   air discharge means for driving the cooling liquid from said heating/cooling passageway;
   control means for deactivating said cooling liquid injecting means and activating said heating electrical means when said means for heating and pumping is activated;
   control means for deactivating said heating electrical current means and activating said cooling liquid injecting means when said means for heating and pumping means is deactivated; and
   control means for activating said air discharge means before said means for heating and pumping is activated.

6. The apparatus of claim 5 in which the at least one heating tube is in communication with a plurality of branch passageways, each branch passageway being in communication with a molding cavity.

* * * * *

UNITED STATES PATENT AND TRADEMARK OFFICE
CERTIFICATE OF CORRECTION

PATENT NO. : 5,382,147
DATED : January 17, 1995
INVENTOR(S) : Isago Miura, et al.

It is certified that error appears in the above-indentified patent and that said Letters Patent is hereby corrected as shown below:

Column 3, line 54, change "In" to --in--.

Column 8, line 42, cancel "means".

Signed and Sealed this

Twelfth Day of September, 1995

Attest:

BRUCE LEHMAN

Attesting Officer     Commissioner of Patents and Trademarks